(12) United States Patent
Chang (10) Patent No.: US 9,497,511 B2
(45) Date of Patent: *Nov. 15, 2016

(54) METHODS AND APPARATUS TO GENERATE RELEVANCE RANKINGS FOR USE BY A PROGRAM SELECTOR OF A MEDIA PRESENTATION SYSTEM

(71) Applicant: AT&T Intellectual Property I, L.P., Atlanta, GA (US)

(72) Inventor: Hisao M. Chang, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,435

(22) Filed: Jan. 12, 2016

(65) Prior Publication Data

US 2016/0127794 A1    May 5, 2016

Related U.S. Application Data

(63) Continuation of application No. 14/729,791, filed on Jun. 3, 2015, now Pat. No. 9,277,287, which is a continuation of application No. 12/120,368, filed on May 14, 2008, now Pat. No. 9,077,933.

(51) Int. Cl.
*H04N 21/475* (2011.01)
*H04N 21/482* (2011.01)
*H04N 5/445* (2011.01)
(Continued)

(52) U.S. Cl.
CPC ...... *H04N 21/4826* (2013.01); *H04N 5/44543* (2013.01); *H04N 7/17318* (2013.01); *H04N 21/252* (2013.01); *H04N 21/25891* (2013.01); *H04N 21/42203* (2013.01); *H04N 21/4532* (2013.01); *H04N 21/4667* (2013.01); *H04N 21/4668* (2013.01); *H04N 21/4755* (2013.01); *H04N 21/4756* (2013.01); *H04N 21/64322* (2013.01); *H04N 21/6582* (2013.01); *H04N 21/84* (2013.01)

(58) Field of Classification Search
CPC ............. H04N 21/4755; H04N 21/4756; H04N 21/4826
See application file for complete search history.

(56) References Cited

U.S. PATENT DOCUMENTS 5,268,990 A   12/1993   Cohen et al.
5,822,731 A   10/1998   Schultz
(Continued)

FOREIGN PATENT DOCUMENTS

GB     2405018      2/2005
WO    2005048587    5/2005

*Primary Examiner* — Ricky Chin
(74) *Attorney, Agent, or Firm* — Akerman LLP; Michael K. Dixon; Mammen (Roy) P. Zachariah, Jr.

(57) ABSTRACT

Example methods and apparatus to generate relevance rankings for use by a program selector of a media presentation system are disclosed. An example method comprises tabulating a plurality of occurrence counts for respective ones of a plurality of terms of a program guide, each of the occurrence counts indicating a corresponding number of times each of the terms appears in the program guide, computing a plurality of relevance ranking scores for respective ones of a plurality of programs listed in the program guide based on the plurality of occurrence counts, selecting a list of programs from the program guide based on the relevance ranking scores, and outputting the list of programs.

20 Claims, 8 Drawing Sheets

(51) Int. Cl.
*H04N 7/173* (2011.01)
*H04N 21/258* (2011.01)
*H04N 21/45* (2011.01)
*H04N 21/466* (2011.01)
*H04N 21/658* (2011.01)
*H04N 21/422* (2011.01)
*H04N 21/643* (2011.01)
*H04N 21/25* (2011.01)
*H04N 21/84* (2011.01)

(56) References Cited

U.S. PATENT DOCUMENTS

| | | |
|---|---|---|
| 5,835,667 A | 11/1998 | Wactlar et al. |
| 5,839,104 A | 11/1998 | Miller et al. |
| 5,933,804 A | 8/1999 | Huang et al. |
| 5,938,447 A | 8/1999 | Kirksey |
| 6,064,959 A | 5/2000 | Young et al. |
| 6,078,885 A | 6/2000 | Beutnagel |
| 6,172,675 B1 | 1/2001 | Ahmad et al. |
| 6,236,965 B1 | 5/2001 | Kim et al. |
| 6,243,713 B1 | 6/2001 | Nelson et al. |
| 6,388,714 B1 | 5/2002 | Schein et al. |
| 6,389,394 B1 | 5/2002 | Fanty |
| 6,442,518 B1 | 8/2002 | Van Thong et al. |
| 6,490,557 B1 | 12/2002 | Jeppesen |
| 6,500,006 B2 | 12/2002 | Wakamoto |
| 6,505,153 B1 | 1/2003 | Van Thong et al. |
| 6,611,803 B1 | 8/2003 | Furuyama et al. |
| 6,697,564 B1 | 2/2004 | Toklu et al. |
| 6,708,150 B1 | 3/2004 | Hirayama et al. |
| 6,728,673 B2 | 4/2004 | Furuyama et al. |
| 6,732,369 B1 | 5/2004 | Schein et al. |
| 6,760,916 B2 | 7/2004 | Holtz et al. |
| 6,768,816 B2 | 7/2004 | Hall, Jr. et al. |
| 6,792,407 B2 | 9/2004 | Kibre et al. |
| 6,816,858 B1 | 11/2004 | Coden et al. |
| 6,873,993 B2 | 3/2005 | Charlesworth et al. |
| 6,973,665 B2 | 12/2005 | Dudkiewicz et al. |
| 7,013,478 B1 | 3/2006 | Hendricks et al. |
| 7,092,496 B1 | 8/2006 | Maes et al. |
| 7,103,197 B2 | 9/2006 | Rhoads |
| 7,130,790 B1 | 10/2006 | Flanagan et al. |
| 7,146,319 B2 | 12/2006 | Hunt |
| 7,209,640 B2 | 4/2007 | Young et al. |
| 7,277,851 B1 | 10/2007 | Henton |
| 7,293,275 B1 | 11/2007 | Krieger et al. |
| 7,337,116 B2 | 2/2008 | Charlesworth et al. |
| 7,640,560 B2 | 12/2009 | Logan et al. |
| 8,041,025 B2 | 10/2011 | Dolph et al. |
| 2001/0021938 A1 | 9/2001 | Fein et al. |
| 2002/0036694 A1 | 3/2002 | Merril |
| 2002/0069063 A1 | 6/2002 | Buchner et al. |
| 2002/0082831 A1 | 6/2002 | Hwang et al. |
| 2002/0161579 A1 | 10/2002 | Saindon et al. |
| 2003/0115049 A1 | 6/2003 | Beutnagel et al. |
| 2003/0182111 A1 | 9/2003 | Handal et al. |
| 2004/0003401 A1 | 1/2004 | Gutta et al. |
| 2004/0078809 A1 | 4/2004 | Drazin |
| 2004/0230430 A1 | 11/2004 | Gupta et al. |
| 2005/0060156 A1 | 3/2005 | Corrigan et al. |
| 2005/0086705 A1 | 4/2005 | Jarman et al. |
| 2005/0172319 A1 | 8/2005 | Reichardt et al. |
| 2005/0183109 A1 | 8/2005 | Basson et al. |
| 2005/0187769 A1 | 8/2005 | Hwang et al. |
| 2006/0156326 A1 | 7/2006 | Goronzy et al. |
| 2006/0212897 A1 | 9/2006 | Li et al. |
| 2006/0236343 A1 | 10/2006 | Chang |
| 2006/0287856 A1 | 12/2006 | He et al. |
| 2007/0011012 A1 | 1/2007 | Yurick et al. |
| 2007/0055523 A1 | 3/2007 | Yang |
| 2007/0106685 A1 | 5/2007 | Houh et al. |
| 2007/0157247 A1 | 7/2007 | Cordray et al. |
| 2007/0208569 A1 | 9/2007 | Subramanian et al. |
| 2007/0239448 A1 | 10/2007 | Zlokarnik |
| 2007/0245381 A1 | 10/2007 | Nagamura |
| 2008/0040111 A1 | 2/2008 | Miyamoto et al. |
| 2008/0046406 A1 | 2/2008 | Seide et al. |
| 2008/0065383 A1 | 3/2008 | Schroeter |
| 2008/0148317 A1 | 6/2008 | Opaluch |
| 2008/0263578 A1 | 10/2008 | Bayer et al. |
| 2008/0284910 A1 | 11/2008 | Erskine et al. |
| 2008/0295132 A1 | 11/2008 | Icho et al. |
| 2009/0009661 A1 | 1/2009 | Murakami et al. |
| 2009/0244372 A1 | 10/2009 | Petronelli et al. |
| 2009/0287486 A1 | 11/2009 | Chang |
| 2012/0035917 A1 | 2/2012 | Kim et al. |

| 610 | 615 | 620 | 625 | 630 | 635 | 640 | 645 | 650 |
|---|---|---|---|---|---|---|---|---|
| CALLSIGN | CH # | TIME | TITLE | SUBTITLE | DESCRIPTION | TYPE | ORIG. DATE | RERUN |
| | | | | | | | | |
| | | | | | | | | |

| 710 | 715 | 720 |
|---|---|---|
| TIME PERIOD | CHANNEL | RATING |
| | | |
| | | |

| 810 | 815 |
|---|---|
| TERM | COUNT |
| | |
| | |

| TITLE | TOTAL # WORDS | USED # WORDS | WORD RANKING | SCORE | OCCURRENCE COUNT |
|---|---|---|---|---|---|
|  |  |  |  |  |  |
|  |  |  |  |  |  |

*FIG. 9*

| TITLE | COUNT |
|---|---|
|  |  |
|  |  |

*FIG. 10A*

| CH # | COUNT |
|---|---|
|  |  |
|  |  |

*FIG. 13*

METHODS AND APPARATUS TO GENERATE RELEVANCE RANKINGS FOR USE BY A PROGRAM SELECTOR OF A MEDIA PRESENTATION SYSTEM

CROSS-REFERENCE TO RELATED APPLICATION

This application is a continuation of and claims priority to U.S. patent application Ser. No. 14/729,791, filed on Jun. 3, 2015, which is a continuation of U.S. patent application Ser. No. 12/120,368, filed on May 14, 2008, now U.S. Pat. No. 9,077,933, each of which are herein incorporated by reference in their entireties.

FIELD OF THE DISCLOSURE

This disclosure relates generally to media presentations systems and, more particularly, to methods and apparatus to generate relevance rankings for use by a program selector of a media presentation system.

BACKGROUND

Interactive media presentation services enable consumers to be more closely involved in the media consumption experience. In general, interactive media presentation services enable two-way communication with a consumer location (e.g., a household or place of business). For example, interactive media presentation services enable a consumer to request information from and to submit information to an interactive media distribution network. One implementation of an interactive media presentation service comprises an Internet protocol (IP) television (IPTV) service.

IPTV services provide media content over a broadband network. In general, an IPTV provider receives media content from media content creators. The IPTV provider converts the media content into packetized digital media streams. The packetized digital media streams are distributed to consumer locations via an IP-based network. Each of the consumer locations includes a consumer device that receives the packetized digital media streams and converts the streams into media content suitable for display on a device such as a television or computer. Because the consumer device communicates with the IPTV provider over the IP-based network, the consumer device can easily transmit data back to the IPTV provider. In other words, the IPTV provider and the consumer device can engage in a two-way communication.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Example methods and apparatus to generate relevance rankings for use by a program selector of a media presentation system are disclosed. A disclosed example method includes tabulating a plurality of occurrence counts for respective ones of a plurality of terms of a program guide, each of the occurrence counts indicating a corresponding number of times each of the terms appears in the program guide, computing a plurality of relevance ranking scores for respective ones of a plurality of programs listed in the program guide based on the plurality of occurrence counts, selecting a list of programs from the program guide based on the relevance ranking scores, and outputting the list of programs of interest.

A disclosed example apparatus includes a relevance ranker to compute a plurality of relevance ranking scores for respective ones of a plurality of programs listed in a program guide based on a number of times that respective ones of a plurality of terms appear in the program guide, a program selector to select a first list of programs from the program guide based on the relevance ranking scores, and a media server to serve the first list of programs.

In the interest of brevity and clarity, throughout the following disclosure references will be made to the example Internet protocol (IP) television (IPTV) based media presentation system 100 of FIG. 1. However, the methods and apparatus described herein to generate relevance rankings for use by a program selector are applicable to other types of media presentation systems, such as cable television systems, terrestrial broadcast systems (analog and/or digital) and/or satellite broadcast systems.

Figure 1:
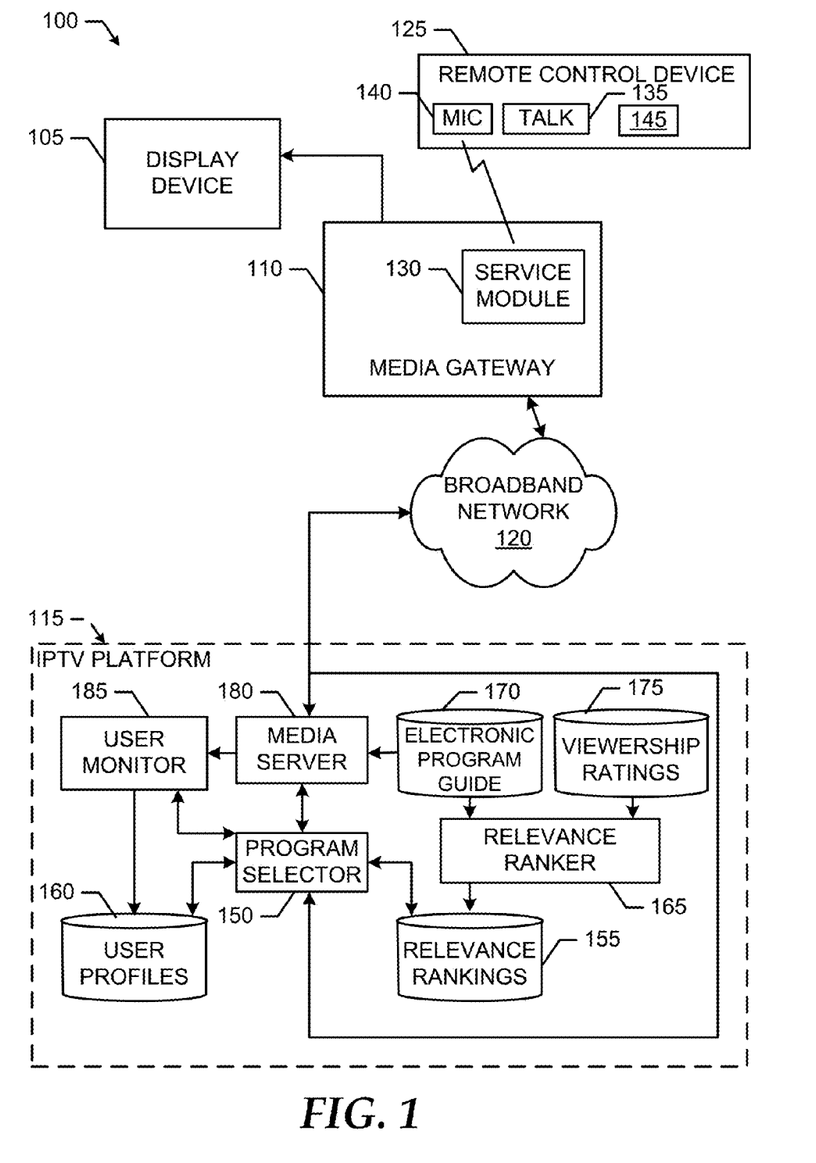
FIG. 1 is a schematic illustration of an example Internet protocol (IP) television (IPTV) based media presentation system constructed in accordance with the teachings of the disclosure.

FIG. 1 is a schematic illustration of an example IPTV-based media presentation system 100 including any number and/or type(s) of display devices, one of which is designated at reference numeral 105. Example display devices 105 include, but are not limited to, a television, a computer monitor, a computer, a handheld media device, and/or a Smartphone. The example display device 105 of FIG. 1 may be implemented and/or be found at any number and/or type(s) of locations, such as a residence or a place of business. Further, the example display device 105 may be a fixed location device, a substantially fixed location device and/or a mobile device. Moreover, the display device 105 may have equipment communicatively and/or electrically coupled to it. For example, a computer monitor 105 may be communicatively coupled to a computer.

To present and/or display media (e.g., movies, televisions shows, sporting events, news programs, audio tracks, images, etc.) at the example display device 105, the example IPTV-based media presentation system 100 of FIG. 1 includes a media gateway 110 and an IPTV platform 115. In some examples, the example media gateway 110 of FIG. 1 comprises an IPTV-based set-top box (STB). The example IPTV platform 115 of FIG. 1 provides media (e.g., video, images and/or audio data), user interfaces and/or program guides to the example media gateway 110 via a broadband network 120. The example broadband network 120 of FIG. 1 may be implemented by any number and/or type(s) of private and/or public IP networks, such as the Internet. Likewise, the example media gateway 110 of FIG. 1 provides user selections and/or inputs made via the display device 105 and/or the media gateway 110 to the IPTV platform 115 via the broadband network 120. For example, the IPTV platform 115 can provide user interface data to the media gateway 110 (e.g., encoded as a motion pictures expert group (MPEG) encoded video stream). The media gateway 110 subsequently decodes and presents a corresponding user interface (e.g., a program guide menu) at the display device 105. An example user interface that could be presented is discussed below in connection with FIG. 2. In response to a presented user interface, a user can use, for example, a remote control device 125 to provide a user input and/or selection to the media gateway 110 (e.g., by pressing one or more buttons of the remote control device 125 to chose a particular program to view), which subsequently sends the user input and/or selection to the IPTV platform 115. The example IPTV platform 115 sends the chosen program to the media gateway 110 for presentation at the display device 105.

The example display device 105 of FIG. 1 may be communicatively and/or electrically coupled to the example media gateway 110 via any number and/or type(s) of interfaces and/or communication technologies, such as a coaxial video distribution signal, a wireless distribution signal, a local area network (LAN) signal, a component video signal, and/or a high-definition multimedia interface (HDMI) signal. The example broadband network 120 of FIG. 1 may be implemented in accordance with any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks. The example media gateway 110 may be communicatively coupled to the broadband network 120 via any number of private and/or public networks and/or communication devices (not shown), such as a router, a modem, and/or a local area network (LAN). For instance, the example media gateway 110 may be coupled to the broadband network 120 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), general packet radio services (GPRS) networks in 3G wireless networks, etc. Moreover, the broadband network 120 of FIG. 1 may extend geographically to include one or more locations near to and/or encompassing the media gateway 110. For example, the broadband network 120 may include a wireless access point (not shown) by which, for example, the media gateway 110 connects to the broadband network 120 and the IPTV platform 115.

Figure 3:
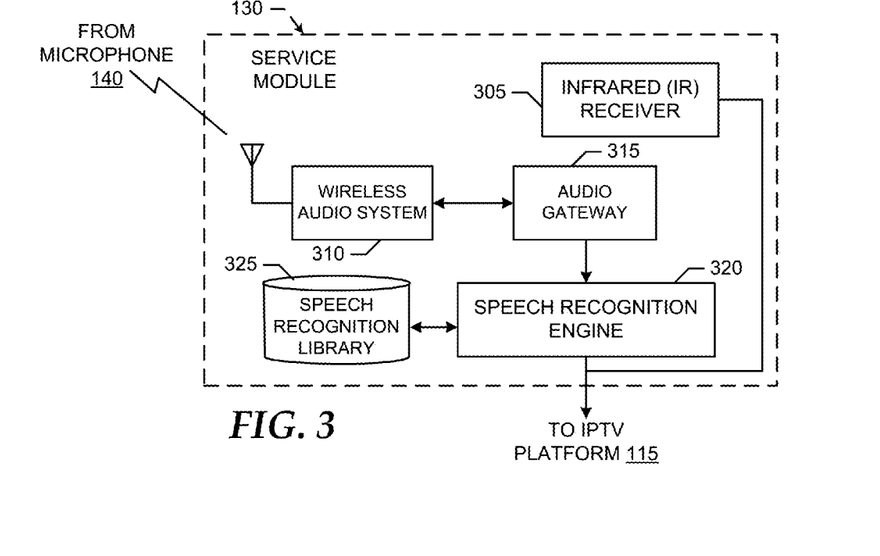
FIG. 3 illustrates an example manner of implementing the example service module of FIG. 1.

To facilitate communication with the example remote control device 125, the example media gateway 110 of FIG. 1 includes any number and/or type(s) of service modules, one of which is designated at reference numeral 130. As illustrated in FIG. 3, the example service module 130 of FIG. 1 includes an infrared (IR) receiver 305 to receive user inputs and/or selections by detecting and/or decoding infrared signals received from the remote control device 125 that correspond to different keys and/or buttons of the remote control device 125. For example, when a talk button 135 of the example remote control device 125 of FIG. 1 is pressed and/or activated, a microphone 140 of the remote control device 125 is activated. Sounds received at the example microphone 140 (e.g., words and/or commands spoken by a user of the remote control device 125) are transmitted by the remote control device 125 to a wireless audio transceiver 310 of the example service module 130. Sounds received by the wireless audio transceiver 310 are conveyed via any type of audio gateway and/or bridge 315 to a speech recognition engine 320. Using any number and/or type of algorithm(s), method(s), logic and/or circuit(s), the example speech recognition engine 320 of FIG. 3 performs speech recognition to detect words spoken by a user in the vicinity of the example remote control device 125 when the talk button 135 has been activated. For example, the speech recognition engine 320 can perform a phonetic transcription of the spoken word(s), and compare the phonetic transcription to a plurality of phonetic transcriptions stored in a speech recognition library 325 to identify the spoken word(s). Example methods and apparatus to create the example speech recognition library 325 of FIG. 3 are described in U.S. patent application Ser. No. 12/120,369, entitled "Methods and Apparatus to Generate a Speech Recognition Library," which was filed on May 14, 2008 and is hereby incorporated by reference in its entirety.

Words recognized by the speech recognition engine 320 are, for example, sent to the IPTV platform 115 via the broadband network 120 and can be used, as described below, to initiate a search for potential programs of interest. For example, the user may speak one or more words, such as "Judge," to indicate that the IPTV platform 115 and/or the media gateway 110 is to identify programs that contain the spoken word(s) in their title and/or description. In some examples, the user can, additionally or alternatively, use one or more additional keys of the example remote control device 125, one of which is designated at reference numeral 145 in FIG. 1, to enter letters to spell one or more words that can be used to identify potential programs of interest. Spoken words (e.g., "play," "volume increase," "start," "stop," etc.) and/or inputs entered via other keys of the remote control device 125 (e.g., pressing a "play" button) can, additionally or alternatively, be used to control the display device 105 and/or the media gateway 110 (e.g., adjust a volume) or to chose a program to be presented at the display device 105.

Returning to FIG. 1, to select programs of potential interest to a user of the media gateway 110, the example IPTV platform 115 of FIG. 1 includes an automatic program selector 150. The example program selector 150 of FIG. 1 selects programs of potential interest based on (a) one or more search criteria (e.g., words spoken and/or entered via the remote control device 125), (b) relevance rankings 155 for programs listed in an electronic program guide 170 and/or (c) one or more user profiles 160. The example electronic program guide 170 may include, for example, currently airing audio/video program (e.g., television shows), upcoming audio/video programs, on-demand programs, programs previously recorded at the media gateway 110, etc. An example manner of implementing the example program selector 150 is described below in connection with FIG. 5. Example machine accessible instructions that may be executed to implement the example program selector 150 are described below in connection with FIG. 12.

To generate the example relevance rankings 155, the example IPTV platform 115 of FIG. 1 includes a relevance ranker 165. The example relevance ranker 165 of FIG. 1 analyzes, computes and/or tabulates (a) how many times each of a plurality of words appears in any program title and/or program description of the electronic program guide 170, and (b) how many times each program title appears in the electronic program guide 170. The example relevance ranker 165 assigns each program listed in the electronic program guide 170 a relevance ranking 155 based on the number of times that terms (e.g., words and/or program titles) appear and/or occur in the electronic program guide 170. Programs having titles appearing more often in the electronic program guide 170 and/or having titles and/or descriptions containing words that appear more frequently in the electronic program guide 170 are considered to be more popular and/or relevant programs and are assigned a higher relevance rank. In the example IPTV platform 115 of FIG. 1, relevance rankings 155 computed by the example relevance ranker 165 are adjusted and/or weighted based on viewership ratings 175. For example, a program corresponding to a broadcast time and/or broadcast channel having a higher viewership rating 175 than a different program has its relevance ranking increased. For instance, a program having a historical viewership rating of 20% has its relevance ranking 155 increased by a corresponding amount (e.g., 20%). Example viewership ratings 175 can be obtained from, for example, The Nielson Company. An example manner of implementing the example relevance ranker 165 of FIG. 1 is described below in connection with FIG. 4. Example machine accessible instructions that may be executed to implement the example relevance ranker 165 are described below in connection with FIG. 11.

To provide media to the media gateway 110, the example IPTV platform 115 of FIG. 1 includes any number and/or type(s) of media servers, one of which is designated at reference numeral 180. When a user of the media gateway 110 chooses to view a particular program, the example media server 180 provides the corresponding media (video, audio and/or images) to the media gateway 110, which decodes and presents the same at the display device 105. When a user of the example media gateway 110 initiates a search for potential programs of interest (e.g., by pressing the example talk button 135 and speaking one or more search criteria, such as word), the media gateway 110 sends the search criteria to the program selector 150. The example program selector 150 of FIG. 1 generates a list of programs satisfying the search criteria and having the highest relevance rankings, and provides the same to the example media server 180. The example media server 180 of FIG. 1 generates a user interface that includes the list of programs selected by the program selector 150 and includes a mechanism for the user to select one of the displayed programs or to request additional programs of interest (e.g., by pressing a specific button 145 of the remote control device 125).

To generate the example user profiles 160, the example IPTV platform 115 of FIG. 1 includes a user monitor 185. The example user monitor 185 monitors, for each user and/or subscriber of the IPTV platform 115, which channels and/or programs have been and/or are being displayed by the media gateway 110, and for how long. Such tabulated historical program display behavior information may be indicative of which channels and/or programs are preferred by each user of the IPTV platform 115, and may be used as described below in connection with FIG. 5 to select programs of potential interest. In some examples, program display behavior information is tabulated in increments of 15 seconds. For instance, a program and/or channel that is displayed for 15 minutes is credited with 60 units of display, while a program and/or channel that is display for 60 minutes is credited with 240 units of display.

An example data structure that may be used to implement the example electronic program guide 170 of FIG. 1 is described below in connection with FIG. 6. An example data structure that may be used to implement the example viewership ratings 175 of FIG. 1 is described below in connection with FIG. 7. An example data structure that may be used to tabulate word occurrences is described below in connection with FIG. 8. An example data structure that may be used to implement the example relevance rankings 155 of FIG. 1 is described below in connection with FIG. 9. Example data structures that may be used to implement the example user profiles 160 of FIG. 1 are described below in connection with FIGS. 10A and 10B.

While an example IPTV-based media presentation system 100 has been illustrated in FIG. 1, the devices, networks, systems, servers and/or processors illustrated in FIG. 1 may be combined, divided, re-arranged, eliminated and/or implemented in any way. For example, while the example program selector 150, the example relevance ranker 165, the example user monitor 185, the example relevance rankings 155, the example user profiles 160, the example electronic program guide 170 and the example viewership ratings 175 are illustrated in connection with the example IPTV platform of FIG. 1, one or more of the example program selector 150, the example relevance ranker 165, the example user monitor 185, the example relevance rankings 155, the example user profiles 160, the example electronic program guide 170 and/or the example viewership ratings 175 may, additionally or alternatively, be implemented in connection with the example media gateway 110. For example, the user monitor 185, the user profile 160, the relevance rankings 155 and the program selector 150 could be implemented in connection with the media gateway 110, with the relevance ranker 165 implemented in connection with the IPTV platform 115 and the IPTV platform 115 providing the computed relevance rankings 155 to the media gateway 110 for use by the program selector 150 at the media gateway 110.

Moreover, the example display device 105, the example media gateway 110, the example IPTV platform 115, the example remote control device 125, the example service module 130, the example IR receiver 305, the example wireless audio system 310, the example audio gateway 315, the example speech recognition engine 320, the example program selector 150, the example relevance rankings 155, the example user profiles 160, the example relevance ranker 165, the example electronic program guide 170, the example viewership ratings 175, the example media server 180, the example user monitor 185, and/or, more generally, the example IPTV system 100 of FIGS. 1 and/or 3 may be implemented by hardware, software, firmware and/or any combination of hardware, software and/or firmware. Thus, for example, any or all of the example display device 105, the example media gateway 110, the example IPTV platform 115, the example remote control device 125, the example service module 130, the example IR receiver 305, the example wireless audio system 310, the example audio gateway 315, the example speech recognition engine 320, the example program selector 150, the example relevance rankings 155, the example user profiles 160, the example relevance ranker 165, the example electronic program guide 170, the example viewership ratings 175, the example media server 180, the example user monitor 185, and/or, more generally, the example IPTV system 100 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example display device 105, the example media gateway 110, the example IPTV platform 115, the example remote control device 125, the example service module 130, the example IR receiver 305, the example wireless audio system 310, the example audio gateway 315, the example speech recognition engine 320, the example program selector 150, the example relevance rankings 155, the example user profiles 160, the example relevance ranker 165, the example electronic program guide 170, the example viewership ratings 175, the example media server 180, the example user monitor 185, and/or, more generally, the example IPTV system 100 are hereby expressly defined to include a tangible medium such as a memory, a digital versatile disc (DVD), a compact disc (CD), etc. storing the software and/or firmware. Further still, the example media gateway 110, the example remote control device 125, the example service module 130, the example IPTV platform 115 and/or, more generally, the example IPTV system 100 of FIGS. 1 and/or 3 may include additional devices, servers, systems, networks, gateways, portals, and/or processors in addition to, or instead of, those illustrated in FIGS. 1 and/or 3 and/or may include more than one of any or all of the illustrated devices, servers, networks, systems, gateways, portals, and/or processors.

Figure 2:
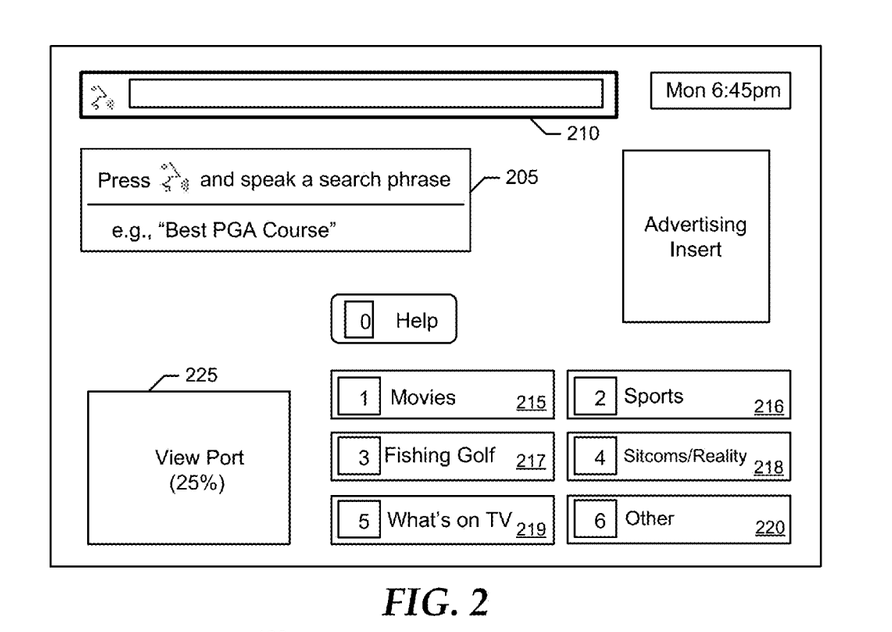
FIG. 2 illustrates an example user interface that may be presented by the example IPTV system of FIG. 1.

FIG. 2 illustrates an example user interface that may be presented at the example display 105 of FIG. 1. The example user interface of FIG. 2 may, for example, be presented when a user turns on the example display 105 and/or the example media gateway 110. To provide directions on how to perform a search for potential programs of interest, the example user interface of FIG. 2 includes an information presenting portion 205. The example information presenting portion 205 of FIG. 2 includes directions on how to initiate a search. In the illustrated example of FIG. 2, the user is directed to press the talk button 135 of the remote control device 125 and then speak one or more search criteria, such as the phrase "Best PGA Course." The information presentation portion 205 could, additionally or alternatively, be used to instruct the user how to select a particular program presented in a list of potential programs of interest.

To display words and/or commands spoken by the user, the example user interface of FIG. 2 includes an entry portion 210. As described above, as the user speaks words and/or commands, the example speech recognition engine 320 of FIG. 3 recognizes the words and/or commands and provides the same to the IPTV platform 115. The media server 180 updates the entry portion 210 to display the recognized spoken words and/or commands Additionally or alternatively, the media gateway 110 could automatically update the entry portion 210 with the spoken words and/or commands without the involvement of the IPTV platform 115.

To present a list of programs of potential interest, the example user interface of FIG. 2 includes a plurality of selection boxes, six of which are designated at reference numerals 215-220. In the example user interface, one or more of the example selection boxes 215-220 correspond to potential program categories of interest (e.g., movies, sports, news, etc.). Additionally or alternatively, the example selection boxes 215-220 can correspond to potential programs of interest identified by spoken and/or entered search criteria, the example relevance rankings 155 and/or the example user profiles 160. Each of the example selection boxes 215-220 of FIG. 2 has an associated number corresponding to a key 145 of the remote control device 125 that may be pressed to select the corresponding program and/or program category. For example, the selection box 215 is associated with the number "1" key 145 of the remote control device 125.

To display a preview of a program, the example user interface of FIG. 2 includes a view port 225. The example view port 225 of FIG. 2 presents a reduced-size version of a program that is current highlighted. For example, if the user uses one or more cursor movement buttons 145 of the remote control device 125 to position a cursor over the selection box 216, a preview of a sports program of interest corresponding to the selection box 216 is displayed in the view port 225. The user can choose a program that is currently being previewed in the view port 225 by, for example, pressing an "Enter" or "Play" key 145 of the remote control device 125 and/or pressing the talk button 135 and speaking the command "Enter" or "Play."

While an example user interface that may be used to present a list of identified programs of potential interest is illustrated in FIG. 2, any number and/or type(s) of additional or alternative user interfaces may be used to present a list of potential programs of interest. Further, the example user interface elements and/or portions illustrated in FIG. 2 may be re-arranged, combined, modified, split and/or positioned in any other way. Moreover, a user interface may include user interface elements and/or portions instead of, or in addition to, those illustrated in FIG. 2 and/or may include more than one of any or all of the illustrated user interface elements and/or portions.

Figure 4:
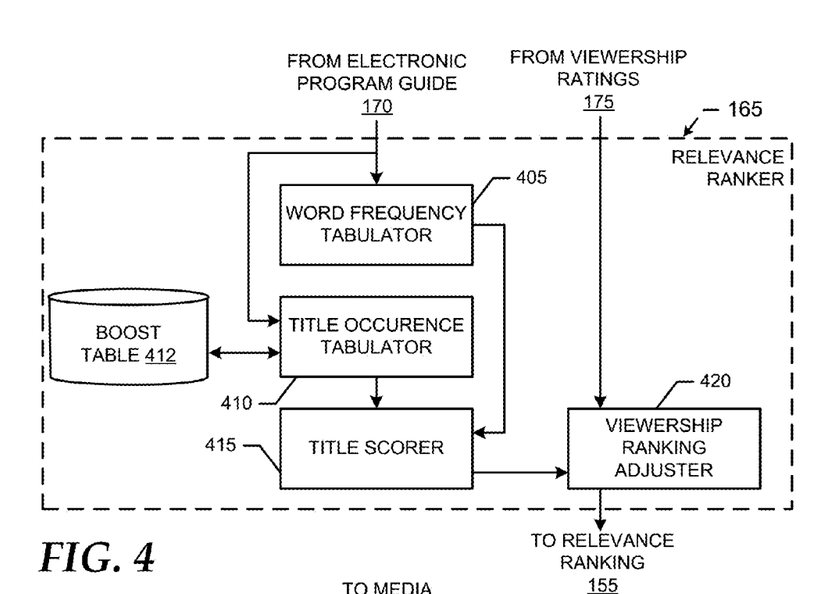
FIG. 4 illustrates an example manner of implementing the example relevance ranker of FIG. 1.

FIG. 4 illustrates an example manner of implementing the example relevance ranker 165 of FIG. 1. To tabulate word occurrence counts, the example relevance ranker 165 of FIG. 4 includes a word frequency tabulator 405. The example word frequency tabulator 405 of FIG. 4 tabulates, counts and/or computes the number of times that each word appears in any program title and/or program description. In the illustrated example, the word frequency tabulator 405 ignores commonly used terms (so-called "non-relevant" words) such as "the," "on," "a," etc. that have limited value when choosing potential programs of interest. In alternative examples, only words that occur in program titles are tabulated. An example data structure that may be used to tabulate word occurrence counts is described below in connection with FIG. 8.

To tabulate program title occurrence counts, the example relevance ranker 165 of FIG. 4 includes a title occurrence tabulator 410. The example title occurrence tabulator 410 of FIG. 4 tabulates, counts and/or computes the number of times that each program title appears in the electronic program guide 170. The example data structure of FIG. 8 may also be used to tabulate program title occurrence counts.

The example title occurrence tabulator 410 of FIG. 4 may, in some instances, adjust one or more title occurrence counts using a boost table 412. For example, the boost table 412 may specify that a premier of a program (i.e., the first time the program has been broadcast) or a special program (e.g., one that is shown few times on select IPTV channels) is to have its corresponding title occurrence count increased by an amount, such as, 100%, 200%, etc. Values stored in the example boost table 412 of FIG. 4 are controlled and/or set by, for example, the operator of the example IPTV platform 115 of FIG. 1. The boost table 412 may, additionally or alternatively, be adjusted to bias the selection of certain programs, such as, those programs that represent more potential revenue to the operator (e.g., pay-per-view programs).

To score program titles, the example relevance ranker 165 of FIG. 4 includes a title scorer 415. The example title scorer 415 of FIG. 4 computes a relevance ranking score for each program listed in the electronic program guide 170 based on the word occurrence counts tabulated by the example word frequency tabulator 405 and the title occurrence counts tabulated by the example title occurrence tabulator 410. For each program listed in the electronic program guide 170, the example title scorer 415 computes an aggregate word ranking by computing an average of the word counts of the words that appear in the program's title. For example, consider a program having a title of "The FSN Final Score," where the word "FSN" appeared 9 times in the electronic program guide 170, the word "Final" appears 10 times in the electronic program guide 170, and the word "Score" appears 3 times in the electronic program guide 170. The aggregate word ranking for the program would be the average of 9, 10 and 3 (i.e., approximately 7.3). For each program, the example title scorer 415 then computes a relevance ranking score by multiplying the aggregate word ranking computed for the program by the number of times that the program's title appeared in the electronic program guide 170. Consider again the example program having the title "The FSN Final Score," and assume that this particular title appeared 14 times in the electronic program guide 170. The program would have a relevance ranking score of 102.7, which is the product of the number of times the title appears in the electronic program guide 170 (e.g., 14) and the aggregate word ranking for the program's title (e.g., 7.3). An example data structure that may be used to store relevance ranking scores is described below in connection with FIG. 9.

To adjust relevance ranking scores based on viewership ratings 175, the example relevance ranker 165 of FIG. 4 includes a viewership ranking adjuster 420. For each program listed in the electronic program guide 170, the example viewership ranking adjuster 420 of FIG. 4 adjusts its relevance ranking score based on its associated viewership rating 175. For example, if the example program having the title "The FSN Final Score," is aired on a channel and/or during an hour-of-day having a 20% market share rating, the relevance ranking score for the example program would be increased by a corresponding amount (e.g., by a factor of 1.2). Viewership ratings 175 may be applied on any or all of a day-of-week, an hour-of-day, and/or a channel basis. Such adjustments modify the relevance ranking scores computed by the example title scorer 415 to incorporate local and/or regional preferences for local and/or regional programs and/or television stations.

While an example manner of implementing the example relevance ranker 165 of FIG. 1 has been illustrated in FIG. 4, one or more of the interfaces, data structures, elements, processes and/or devices illustrated in FIG. 4 may be combined, divided, re-arranged, omitted, eliminated and/or implemented in any other way. Further, the example word frequency tabulator 405, the example title occurrence tabulator 410, the example title scorer 415, the example viewership ratings adjuster 420 and/or, more generally, the example relevance ranker 165 of FIG. 4 may be implemented by hardware, software, firmware and/or any combination of hardware, software and/or firmware. Thus, for example, any or all of the example word frequency tabulator 405, the example title occurrence tabulator 410, the example title scorer 415, the example viewership ranking adjuster 420 and/or, more generally, the example relevance ranker 165 may be implemented by one or more circuit(s), programmable processor(s), ASIC(s), PLD(s) and/or FPLD(s), etc. When any of the appended claims are read to cover a purely software and/or firmware implementation, at least one of the example word frequency tabulator 405, the example title occurrence tabulator 410, the example title scorer 415, the example viewership ranking adjuster 420 and/or, more generally, the example relevance ranker 165 are hereby expressly defined to include a tangible medium such as a memory, a DVD, a CD, etc. storing the firmware and/or software. Further still, a relevance ranker may include interfaces, data structures, elements, processes and/ or devices instead of, or in addition to, those illustrated in FIG. 4 and/or may include more than one of any or all of the illustrated interfaces, data structures, elements, processes and/or devices.

Figure 5:
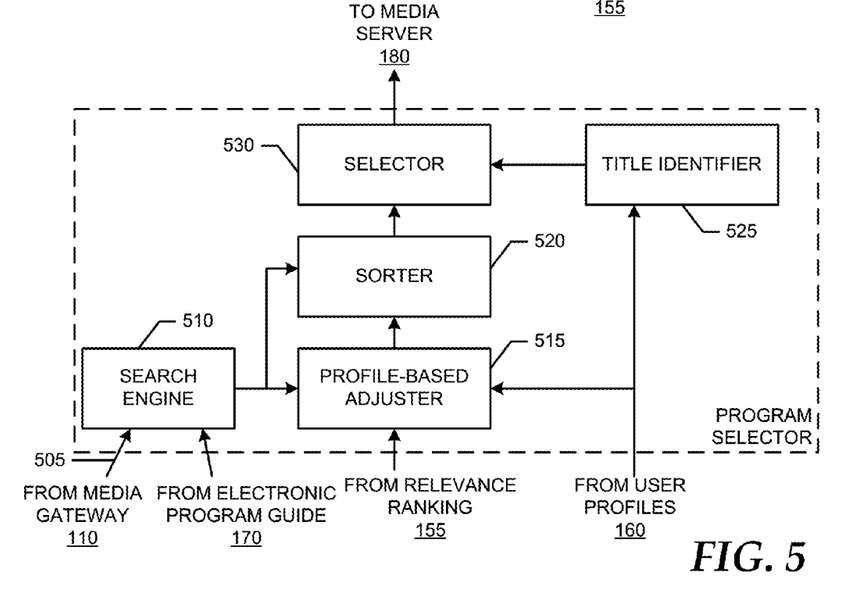
FIG. 5 illustrates an example manner of implementing the example program selector of FIG. 1.

FIG. 5 illustrates an example manner of implementing the example program selector 150 of FIG. 1. To identify programs of the example electronic program guide 170 matching one or more search criteria 505 received from the example media gateway 110, the example program selector 150 of FIG. 5 includes any type of search engine 510. The example search engine 510 of FIG. 5 searches the electronic program guide 170 to identify programs having program titles and/or descriptions that contain one or more of the search criteria 505. For example, for a search criteria 505 of "Judge Judy," the example search engine 510 would identify all programs having "Judge," "Judy," or "Judge Judy" appearing in their program titles and/or descriptions. In some examples, only program titles are searched to identify program matching the search criteria 505.

To adjust the relevance ranking scores of programs identified by the example search engine 510, the example program selector 150 of FIG. 5 include a profile-based adjuster 515. Using any method(s), algorithm(s), rule(s) and/or logic, the example profile-based adjuster 515 adjusts relevance ranking scores based on a user's profile 160. In some examples, each program and/or channel listed in a user's profile 160 is assigned a 1, 2, 3, 4 or 5 star ratings based on the number of display credits accumulated over a time period (e.g., a week, a month or a year), with each star rating having an associated relevance ranking adjustment. For example, a 5-star rating would correspond to a 20% increase in the relevance ranking score, a 4-star would correspond to a 15% increase, a 3-star would correspond to a 10% increase, a 2-star would correspond to a 5% increase, and a 1-star would correspond to no increase. In some examples, a user is able to manually limit and/or adjust the range of adjustments made by the profile-based adjuster 515. For example, a first user may be interested in continually trying new programs and, thus, wants very little of his/her historical viewing patterns to affect a displayed list of potential programs of interest, while a second user may prefer to have their list(s) of potential programs of interest more heavily weighted based on their historical viewing patterns.

To sort programs identified by the example search engine 510, the example program selector 150 of FIG. 5 includes a sorter 520. The example sorter 520 of FIG. 5 sorts the lists of programs identified by the example search engine 510 based on their relevance rankings 155 as computed by the example relevance ranker 165 and as adjusted by the example profile-based adjuster 515.

To identify additional programs of interest, the example program selector 150 of FIG. 5 includes a title identifier 525. The example title identifier 525 of FIG. 5 determines whether any other user profiles 160 are similar to the user profile 160 of a presently considered user. In some examples, user profiles 160 are compared by computing a correlation metric that represents the similarity and/or dissimilarity between two user profiles 160. For example, two user's who principally watch a lot of sports on the weekends would have similar user profiles 160. For a presently considered user, the example title identifier 525 identifies whether any other user profiles 160 are similar to the presently considered user's profile 160. If any such user profiles 160 are identified, the example title identifier 525 identifies which programs the users corresponding to the user profiles 160 they have chosen to display as additional programs of interest.

To select a list of potential programs of interest, the example program selector 150 of FIG. 5 includes a selector 530. The example selector 530 of FIG. 5 selects the most relevant (e.g., top 5) programs identified by the example search engine 510 based on how they were sorted by the example sorter 520 using the profile-adjusted relevance ranking scores computed by the example profile-based adjuster 515. If a program is identified by the example title identifier 525 based on one or more similar user profiles 160, such identified programs can be presented instead of, or in addition to, the top programs identified by the example sorter 520.

While an example manner of implementing the example program selector 150 of FIG. 1 has been illustrated in FIG. 5, one or more of the interfaces, data structures, elements, processes and/or devices illustrated in FIG. 5 may be combined, divided, re-arranged, omitted, eliminated and/or implemented in any other way. Further, the example search engine 510, the example profile-based adjuster 515, the example sorter 520, the example title identifier 525, the example selector 530 and/or, more generally, the example program selector 150 of FIG. 5 may be implemented by hardware, software, firmware and/or any combination of hardware, software and/or firmware. Thus, for example, any or all of the example search engine 510, the example profile-based adjuster 515, the example sorter 520, the example title identifier 525, the example selector 530 and/or, more generally, the example program selector 150 may be implemented by one or more circuit(s), programmable processor(s), ASIC(s), PLD(s) and/or FPLD(s), etc. When any of the appended claims are read to cover a purely software and/or firmware implementation, at least one of the example search engine 510, the example profile-based adjuster 515, the example sorter 520, the example title identifier 525, the example selector 530 and/or, more generally, the example program selector 150 are hereby expressly defined to include a tangible medium such as a memory, a DVD, a CD, etc. storing the software and/or firmware. Further still, a program selector may include interfaces, data structures, elements, processes and/or devices instead of, or in addition to, those illustrated in FIG. 5 and/or may include more than one of any or all of the illustrated interfaces, data structures, elements, processes and/or devices.

Figure 6:
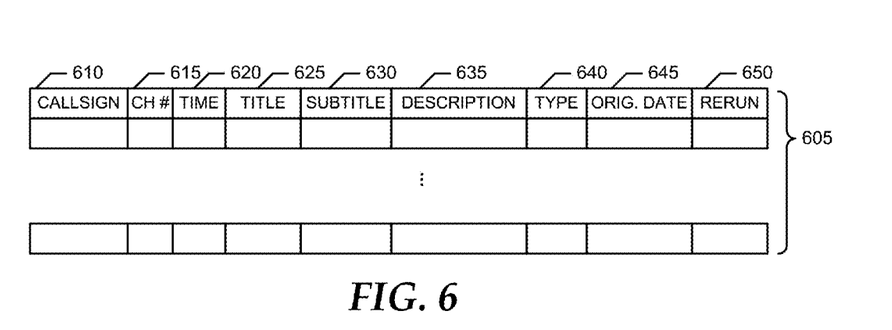
FIG. 6 illustrates an example data structure that may be used to implement the example electronic program guide of FIG. 1.

FIG. 6 illustrates an example data structure that may be used to implement the example electronic program guide 170 of FIG. 1. The example data structure of FIG. 6 includes a plurality of entries 605 for respective ones of a plurality of programs. To represent a channel, each of the example entries 605 of FIG. 6 includes a callsign field 610 and a channel number field 615. Each of the example callsign fields 610 of FIG. 6 contains one or more letters and/or numbers (e.g., WGN, CNN, MSNBC, IPTV address, etc.) that represent a particular broadcaster. Each of the example channel number fields 615 of FIG. 6 contains one or more numbers that represent the broadcast channel or IP address assigned to the broadcaster represented by the callsign field 610.

To represent when a program is to be and/or was broadcast, each of the example entries 605 of FIG. 6 includes a time field 620. Each of the example time fields 620 of FIG. 6 contains one or more letters and/or characters that represent a start time for the associated program.

To describe a program, each of the example entries 605 of FIG. 6 includes a title field 625, a sub-title field 630 and a program description field 635. The example title fields 625 and the example sub-title fields 630 of FIG. 6 each contain one or more words that collectively represent a title for a particular program 605. Each of the example program description fields 635 of FIG. 6 contains one or more words that represent a description of the corresponding program (e.g., describes a particular episode or a series).

To represent a program type, each of the example entries 605 of FIG. 6 includes a type field 640. Each of the example type fields 640 of FIG. 6 contains one or more characters and/or words that represents a type of show (e.g., series, movie, sports, etc.)

To represent an original broadcast date, each of the example entries 605 of FIG. 6 includes a date field 645. Each of the example date fields 645 of FIG. 6 contains one or more letters and/or numbers that represent the date on which the program originally was broadcast.

To represent whether the program is a rerun, each of the example entries 605 of FIG. 6 includes a rerun field 650.

Each of the example rerun fields 650 of FIG. 6 contains a flag that indicates whether the program is a rerun or an original broadcast.

Figure 7:
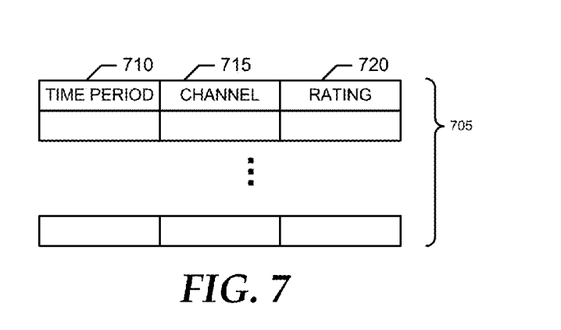
FIG. 7 illustrates an example data structure that may be used to implement the example viewership ratings of FIG. 1.

FIG. 7 illustrates an example data structure that may be used to implement the example viewership ratings 175 of FIG. 1. The example data structure of FIG. 7 includes a plurality of entries 705 for respective ones of a plurality of combinations of time periods and television channels. To represent a time period, each of the example entries 705 of FIG. 7 includes a time period field 710. Each of the example time period fields 710 of FIG. 7 contains one or more letters, numbers and/or characters that represent a day-of-the month, and a half-hour of the day.

To represent a television station, each of the example entries 705 of FIG. 7 includes a channel number field 715. Each of the example channel number fields 715 of FIG. 7 contains one or more numbers that represent the broadcast channel or IP address assigned to a particular broadcaster.

To store a viewership rating obtained, for example, from a third-party provider, each of the example entries 705 of FIG. 7 includes a rating field 720. Each of the example rating field 720 of FIG. 7 contains one or more numbers that represent a viewership and/or market share rating.

Figure 8:
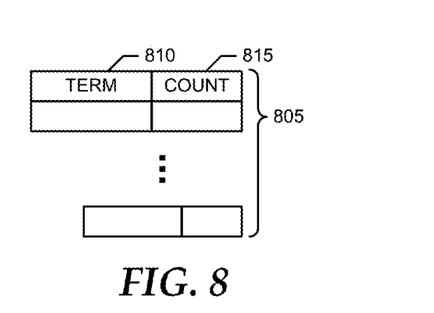
FIG. 8 illustrates an example data structure that may be used to tabulate word occurrence counts.

FIG. 8 illustrates an example data structure that may be used to tabulate word occurrence counts and/or program title occurrence counts. The example data structure of FIG. 8 includes a plurality of entries 805 for respective ones of a plurality of electronic program guide terms (e.g., words and/or program titles). To represent an electronic program guide term, each of the example entries 805 of FIG. 8 includes a term field 810. Each of the example term fields 810 of FIG. 8 contains one or more letters that represent a word, and/or one or more words that represent a program title.

To store an occurrence count, each of the example entries 805 of FIG. 8 includes a count field 815. Each of the example count fields 815 of FIG. 8 contains a number that represents the number of times that the associated term 810 occurred in an electronic program guide 170.

Figure 9:
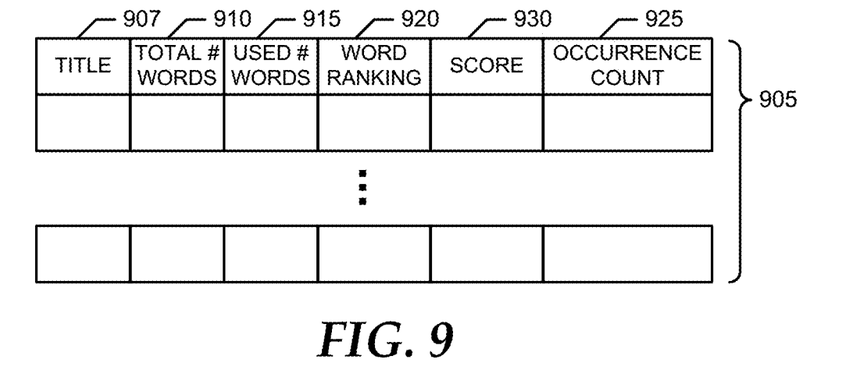
FIG. 9 illustrates an example data structure that may be used to implement the example relevance rankings of FIG. 1.

FIG. 9 illustrates an example data structure that may be used to implement the relevance rankings 155 of FIG. 1. The example data structure of FIG. 9 includes a plurality of entries 905 for respective ones of a plurality of programs. To represent a program, each of the example entries 905 of FIG. 9 includes a title field 907. Each of the example title fields 907 of FIG. 9 contains one or more words that represent a program title.

To store the number of words in the program title 907, each of the example entries 905 of FIG. 9 includes a total number of words field 910. Each of the example total number of words fields 910 of FIG. 9 includes a number that represents the number of words in the program title field 907.

To store the number of words in the program title 907 that were used to compute a relevance ranking score, each of the example entries 905 of FIG. 9 includes a used number of words field 915. Each of the example used number of words fields 915 of FIG. 9 includes a number that represents the number of words in the program title field 907 used to compute a corresponding relevance ranking score.

To store aggregate word rankings, each of the example entries 905 of FIG. 9 includes a word ranking field 920. Each of the example word ranking fields 920 of FIG. 9 includes a number that represents the average of the occurrence counts of the "functional" words of the program title 907 (i.e., the words that are not identified as "non-relevant"). For example, terms like "a," "the," "an," and/or other words that are not considered "functional" because they are common and/or provide little specific meaning in the title.

To store program title occurrence counts, each of the example entries 905 of FIG. 9 includes an occurrence count field 925. Each of the example occurrence count fields 925 contains a number that represents the number of times that the program title 907 occurred in the electronic program guide 170.

To store relevance ranking scores, each of the example entries 905 of FIG. 9 includes a score field 930. Each of the example score fields 930 of FIG. 9 includes a number representative of a relevance ranking score.

Figure 10A:
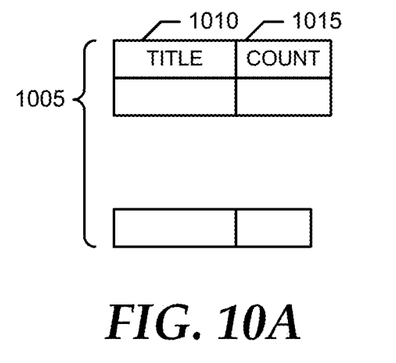
FIGS. 10A and 10B illustrate example data structures that may be used to implement the example user profiles of FIG. 1.
Figure 10B:
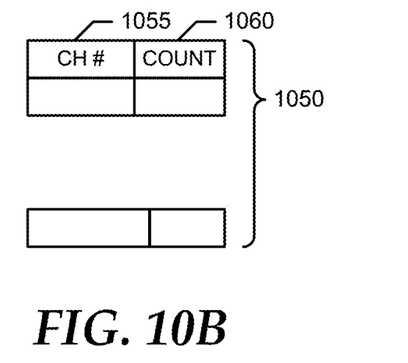

FIGS. 10A and 10B illustrate example data structures that may be used to implement each of the example user profiles 160 of FIG. 1. The example data structure of FIG. 10A includes a plurality of entries 1005 for respective ones of a plurality of programs. To represent a program, each of the example entries 1005 of FIG. 10A includes a title field 1010. Each of the example title fields 1010 of FIG. 10A contains one or more words that represent a program title.

To store numbers of time intervals, each of the example entries 1005 of FIG. 10A includes a count field 1015. Each of the example count fields 1015 of FIG. 10A includes a number that represents the number of time intervals (e.g., 15 second intervals) over which the program 1010 was displayed.

The example data structure of FIG. 10B includes a plurality of entries 1050 for respective ones of a plurality of television channels. To represent a television channel, each of the example entries 1050 of FIG. 10B includes a channel number field 1055. Each of the example channel number fields 1055 of FIG. 10B contains one or more numbers that represent a broadcast channel or IPTV address assigned to a broadcaster.

To store numbers of time intervals in which a corresponding channel was displayed, each of the example entries 1050 of FIG. 10B includes a count field 1015. Each of the example count fields 1015 of FIG. 10B includes a number that represents the number of time intervals (e.g., 15 second intervals) over which the channel 1055 was displayed While example data structures are illustrated in FIGS. 6-9, 10A and 10B, the example data structures of FIGS. 6-9, 10A and/or 10B may be implemented using any number and/or type(s) of other and/or additional fields and/or data. Further, the fields and/or data illustrated in FIGS. 6-9, 10A and/or 10B may be combined, divided, re-arranged, eliminated and/or implemented in any way. Moreover, the example data structures may include fields and/or data in addition to, or instead of, those illustrated in FIGS. 6-9, 10A and/or 10B, and/or may include more than one of any or all of the illustrated fields and/or data.

Figure 11:
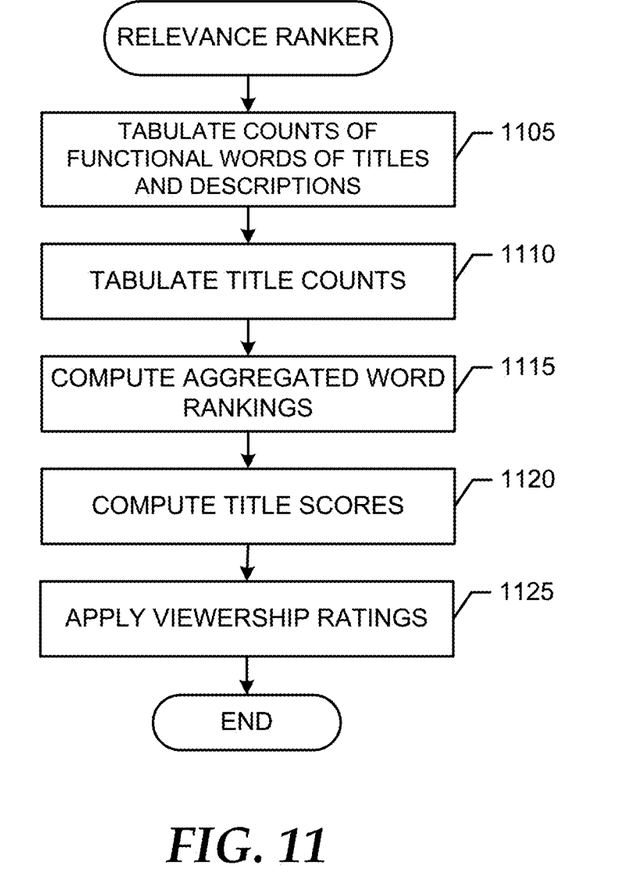
FIG. 11 is a flowchart representative of example machine accessible instructions that may be executed by, for example, a processor to implement any or all of the example relevance rankers of FIGS. 1 and/or 4.
Figure 12:
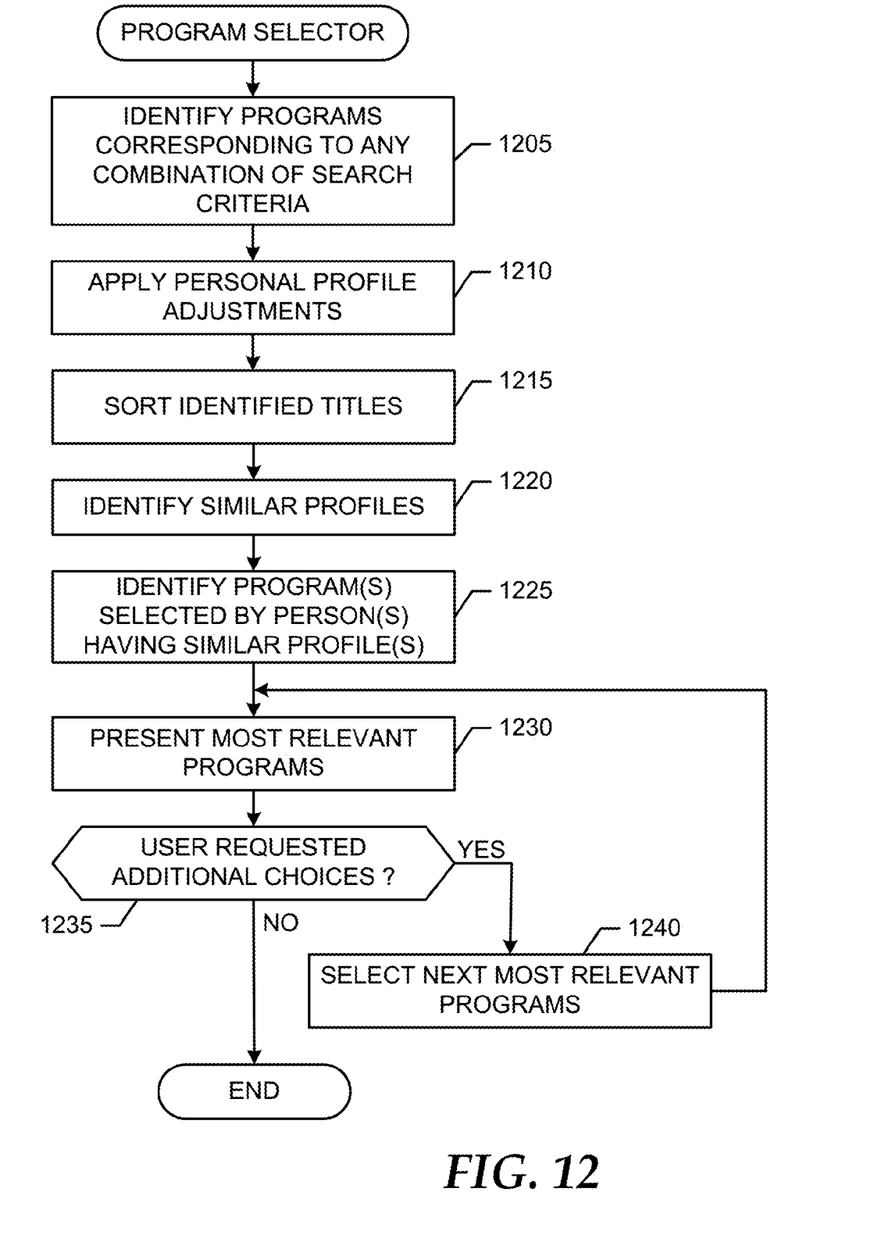
FIG. 12 is a flowchart representative of example machine accessible instructions that may be executed by, for example, a processor to implement any or all of the example program selectors of FIGS. 1 and/or 5.

FIG. 11 illustrates example machine accessible instructions that may be executed to implement any or all of the example relevance rankers 165 of FIGS. 1 and/or 4. FIG. 12 illustrates example machine accessible instructions that may be executed to implement any or all of the example program selectors 150 of FIGS. 1 and/or 5. The example machine accessible instructions of FIGS. 11 and/or 12 may be executed by a processor, a controller and/or any other suitable processing device. For example, the example machine accessible instructions of FIGS. 11 and/or 12 may be embodied in coded instructions stored on a tangible medium such as a flash memory, a ROM and/or RAM associated with a processor (e.g., the example processor P105 discussed below in connection with FIG. 13). Alternatively, some or all of the example machine accessible instructions of FIGS. 11 and/or 12 may be implemented using any combination(s) of ASIC(s), PLD(s), FPLD(s), discrete logic, hardware, firmware, etc. Also, some or all of the example machine accessible instructions of FIGS. 11 and/or 12 may be implemented manually or as any combination of any of the foregoing techniques, for example, any combination of firmware, software, discrete logic and/or hardware. Further, although the example operations of FIGS. 11 and 12 are described with reference to the flowcharts of FIGS. 11 and 12, many other methods of implementing the operations of FIGS. 11 and/or 12 may be employed. For example, the order of execution of the blocks may be changed, and/or one or more of the blocks described may be changed, eliminated, sub-divided, or combined. Additionally, any or all of the example machine accessible instructions of FIGS. 11 and/or 12 may be carried out sequentially and/or carried out in parallel by, for example, separate processing threads, processors, devices, discrete logic, circuits, etc.

The example machine accessible instructions of FIG. 11 begin when a new and/or updated electronic program guide 170 is available. The example word frequency tabulator 405 of FIG. 4 tabulates occurrence counts for each functional (i.e., meaningful) word of the program titles and/or program descriptions appearing in the electronic program guide 170 (block 1105). The example title occurrence tabulator 410 tabulates occurrence counts for each program of the electronic program guide 170 (block 1110). The title occurrence tabulator 410 may, in some examples, adjust one or more of the title occurrence counts according to the example boost table 412. The example title scorer 415 computes aggregated word rankings (block 1115) and computes relevance ranking scores (block 1120) for each program. The example viewership ranking adjuster 420 then applies the example viewership ratings 175 to adjust the relevance rankings for localized and/or regional viewership preferences. Control then exits from the example machine accessible instructions of FIG. 11.

The example machine accessible instructions of FIG. 12 begin when search criteria (e.g., words) are received from the example media gateway 110 at the example program selector 150 of FIG. 1. The example search engine 510 of FIG. 5 performs a search of the electronic program guide 170 to identify programs that correspond to any combination of the search criteria (block 1205). The example profile-based adjuster 515 adjusts the relevance ranking scores of the programs identified by the search engine 510 based on a user profile 160 (block 1210).

The example sorter 520 sorts the list of identified programs based on the adjusted relevance ranking scores (block 1215). The title identifier 525 identifies any user profiles similar to the user's profile (block 1220). The title identifier 525 identifies programs that have been chosen by a user having a similar profile (block 1225). The selector 530 then selects a list of programs of potential interest based on the sorted list of identified programs and any program(s) identified by the title identifier 525 (block 1230).

The example program selector 150 provides the list of programs of potential interest to the media server 180, which presents the list at the example display 105 (block 1230). If the user requests additional choices (block 1235), the selector 530 creates a second list of programs of potential interest from the next highest ranked programs (block 1240). Control then returns to block 1230 to present the next most relevant programs of potential interest. If the user does not request additional choices (block 1235), control exits from the example machine accessible instructions of FIG. 12.

Figure 13:
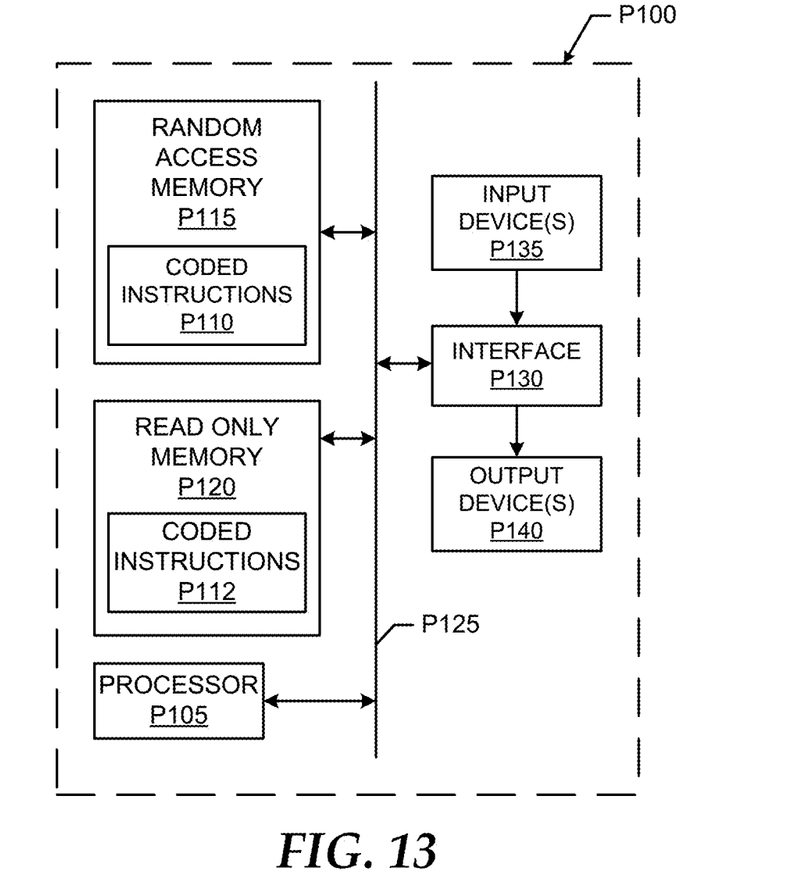
FIG. 13 is a schematic illustration of an example processor platform that may be used and/or programmed to execute the example machine accessible instructions of FIGS. 11 and/or 12 to implement any of all of the example methods and apparatus described herein.

FIG. 13 is a schematic diagram of an example processor platform P100 that may be used and/or programmed to implement all or a portion of any or all of the example program selector 150, the example relevance ranker 165, the example user monitor 185 and/or the example media server 180 disclosed herein. For example, the processor platform P100 can be implemented by one or more general-purpose processors, processor cores, microcontrollers, etc.

The processor platform P100 of the example of FIG. 13 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine accessible instructions of FIGS. 11 and/or 12 to implement the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown). The memory P115, P120 may be used to, for example, implement any or all of the example electronic program guide 170, the example viewership ratings 175, the example relevance rankings 155 and/or the example user profiles 160.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Of course, the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
a memory that stores instructions;
a processor that executes the instructions to perform operations, the operations comprising:
computing, for a program, a relevance ranking score, wherein the relevance ranking score is computed by multiplying an average of occurrence counts for a plurality of terms associated with the program by a number of times the program is listed in a program guide;
adjusting the relevance ranking score for the program based on a user profile; and
generating, for display on a display device, a sorted list of programs including the program, wherein the sorted list is sorted based on the relevance ranking score for the program.

2. The system of claim 1, wherein the operations further comprise calculating the average of occurrence counts for the plurality of terms associated with the program.

3. The system of claim 1, wherein the operations further comprise adjusting the relevance ranking score based on a viewership rating.

4. The system of claim 1, wherein the operations further comprise adjusting the occurrence counts based on a boost table.

5. The system of claim 1, wherein the operations further comprise identifying a different user profile having a similarity to the user profile based on a correlation metric.

6. The system of claim 5, wherein the operations further comprise weighting the relevance ranking score based on the similarity between the different user profile and the user profile.

7. The system of claim 1, wherein the operations further comprise sorting the programs in the sorted list of programs.

8. The system of claim 1, wherein the operations further comprise receiving search criteria for identifying a plurality of programs corresponding to the search criteria.

9. The system of claim 8, wherein the operations further comprise identifying the plurality of programs based on the search criteria and generating the sorted list of programs based on the search criteria.

10. The system of claim 1, wherein the operations further comprise monitoring a plurality of channels and the programs in the list of programs being displayed by the display device.

11. The system of claim 1, wherein the operations further comprise multiplying an occurrence count utilized to determine the average occurrence account with a boost value.

12. The system of claim 1, wherein the operations further comprise weighting the relevance ranking score based on the user profile and based on a different user profile.

13. A method, comprising:
computing, for a program, a relevance ranking score, wherein the relevance ranking score is computed by multiplying an average of occurrence counts for a plurality of terms associated with the program by a number of times the program is listed in a program guide;
adjusting, by utilizing instructions from a memory that are executed by a processor, the relevance ranking score for the program based on a user profile; and
generating, for display on a display device, a sorted list of programs including the program, wherein the sorted list is sorted based on the relevance ranking score for the program.

14. The method of claim 13, further comprising calculating the average of occurrence counts for the plurality of terms associated with the program.

15. The method of claim 13, further comprising identifying a different user profile having a similarity to the user profile based on a correlation metric.

16. The method of claim 15, further comprising weighting the relevance ranking score based on the similarity between the different user profile and the user profile.

17. The method of claim 13, further comprising adjusting the relevance ranking score based on a viewership rating.

18. The method of claim 13, further comprising monitoring media selections made by a user to form the user profile.

19. The method of claim 13, further comprising storing the relevance ranking score for the program.

20. A non-transitory medium including machine readable instructions which, when loaded and executed by a processor, cause the processor to perform operations, the operations comprising:

computing, for a program, a relevance ranking score, wherein the relevance ranking score is computed by multiplying an average of occurrence counts for a plurality of terms associated with the program by a number of times the program is listed in a program guide;

modifying the relevance ranking score for the program based on a user profile; and     generating, for display on a display device, a sorted list of programs including the program, wherein the sorted list is sorted based on the relevance ranking score for the program.

\* \* \* \* \*